Jan. 19, 1937.  J. T. RIEDL  2,068,471
MILK CAN ATTACHMENT
Filed March 6, 1936  3 Sheets-Sheet 1
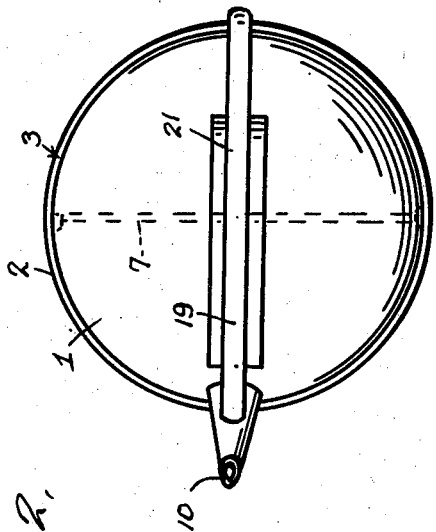
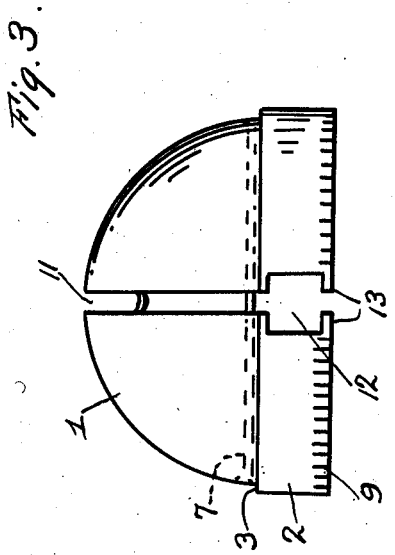
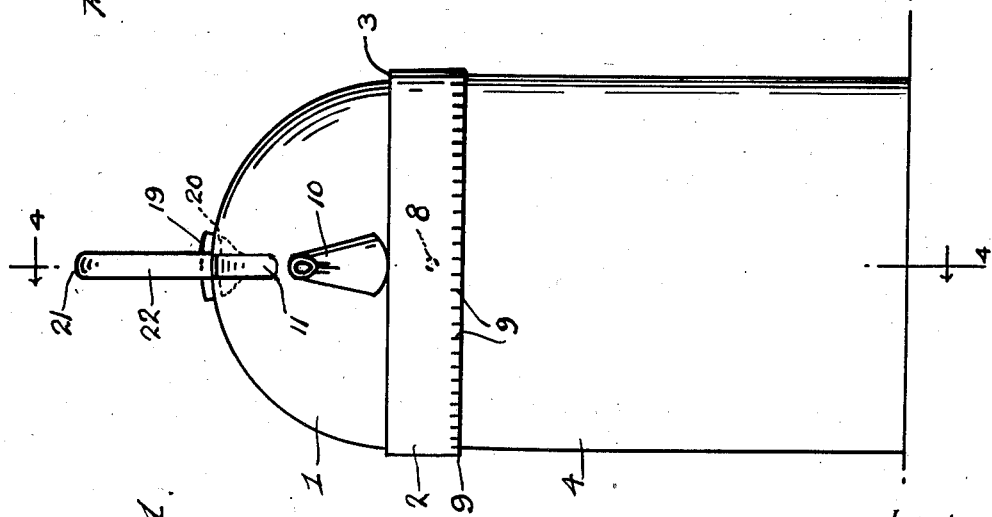
Inventor
J. T. Riedl Jan. 19, 1937.  J. T. RIEDL  2,068,471
MILK CAN ATTACHMENT
Filed March 6, 1936  3 Sheets-Sheet 2
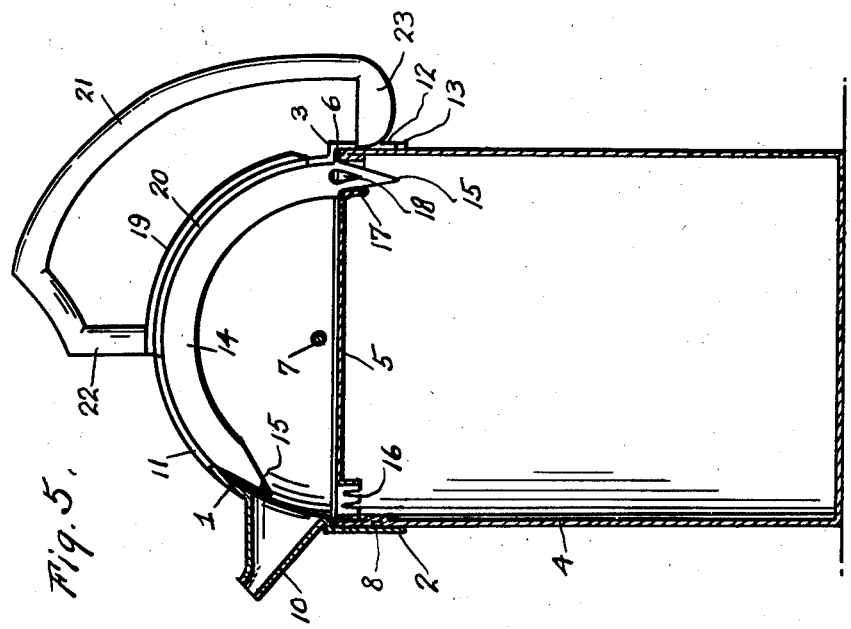
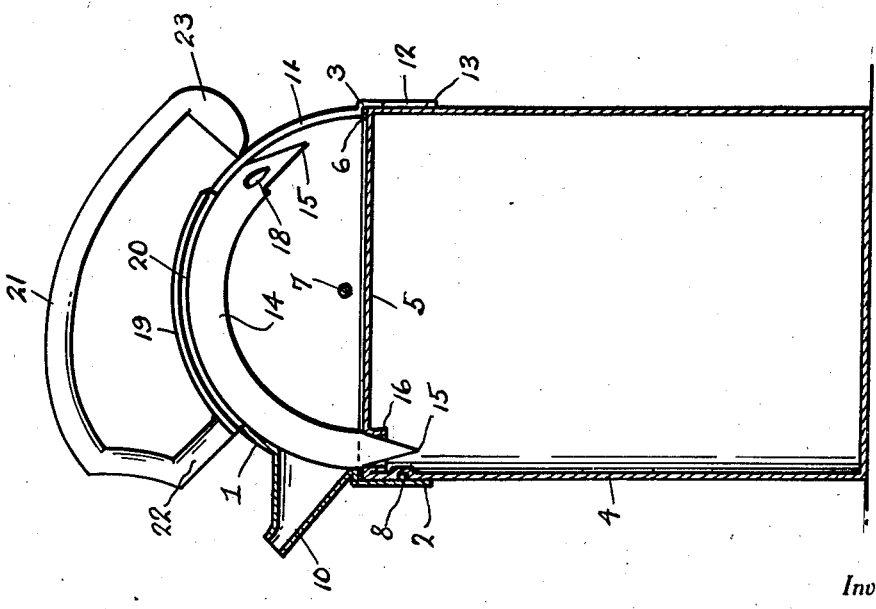
Inventor
J. T. Riedl
By Clarence A. O'Brien and
Hyman Berman  Attorneys Jan. 19, 1937. J. T. RIEDL 2,068,471
MILK CAN ATTACHMENT
Filed March 6, 1936 3 Sheets-Sheet 3

Inventor
J. T. Riedl
By Clarence A O'Brien and
Hyman Berman Attorneys

Patented Jan. 19, 1937

2,068,471

UNITED STATES PATENT OFFICE 2,068,471

MILK CAN ATTACHMENT

Joe T. Riedl, Dickinson, N. Dak., assignor of one-fourth to Martin Binek and one-fourth to Sylvester Binek, both of Dickinson, N. Dak.

Application March 6, 1936, Serial No. 67,555

10 Claims. (Cl. 221—23)

The present invention relates to new and useful improvements in attachments particularly for evaporated and condensed milk cans and has for its primary object to provide, in a manner as hereinafter set forth, a device embodying a novel construction, combination and arrangement of parts, through the medium of which the top of a can may be expeditiously punched and the milk poured therefrom in a convenient and sanitary manner.

Another very important object of the invention is to provide an attachment of the aforementioned character which embodies novel means for detachably securing the device in position on a can and which materially facilitates the handling of said can when dispensing the milk.

Other objects of the invention are to provide a milk can attachment of the character described which will be comparatively simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in front elevation of an attachment constructed in accordance with the present invention, showing the device mounted in position on a milk can.

Figure 2 is a top plan view of the invention.

Figure 3 is a detail view in rear elevation of the dome.

Figure 4 is a view in vertical section, showing the pouring opening being formed in the can.

Figure 5 is a vertical sectional view, showing the vent opening being punched in the can.

Figure 7:
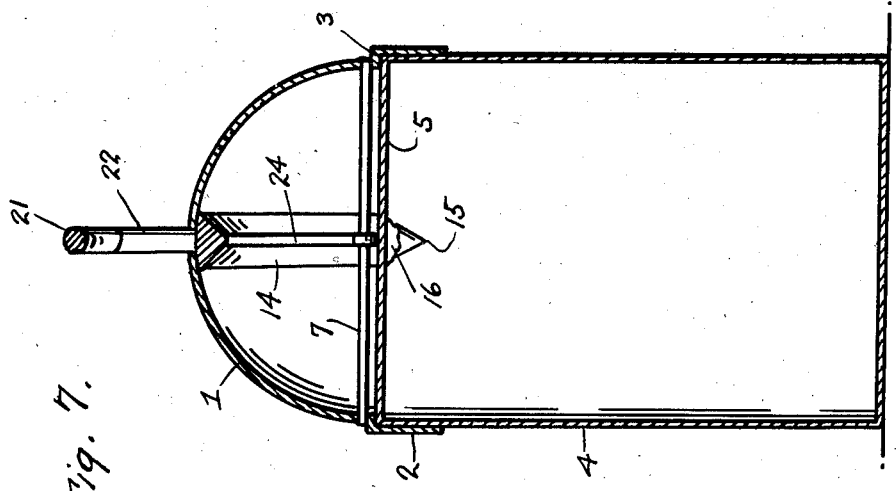
Figure 7 is a vertical sectional view, taken substantially on the line 7—7 of Figure 6.

Referring now to the drawings in detail, it will be seen that the embodiment of the invention which has been illustrated comprises a dome 1 of any suitable material, preferably metal. Depending from the dome 1 is an enlarged annular skirt 2 providing a shoulder 3. The skirt 2 is adapted to encircle the upper portion of a milk can 4 and the shoulder 3 is adapted to rest on the top 5 thereof, a gasket 6 of suitable material being provided beneath said shoulder 3. Extending transversely in the lower portion of the dome 1 is a brace rod 7. A projection 8 is provided in the front portion of the skirt 2 for preventing said skirt from slipping upwardly off the can 4 at this point. The lower portion of the skirt 2 is crimped, as at 9. The reference numeral 10 designates a pouring spout which projects from the front portion of the dome 1.

Extending rearwardly in the dome 1 from a point adjacent the spout 10 is a slot 11 which extends downwardly through the rear of the skirt 2, as best seen in Figure 3 of the drawings. The slot 11, where it traverses the skirt 2, is enlarged, as at 12, for a purpose which will be presently set forth. The rear end of the slot 11, together with the enlargement 12, provides fingers 13 on the lower portion of the skirt 2 at the rear thereof.

Slidable in the slot 11 is an arcuate punch 14 which terminates, at its ends, in points 15 which are adapted to penetrate the can top 5 in a manner to form pouring and vent openings 16 and 17, respectively. Adjacent its rear end, the arcuate punch 14 has formed therein an elongated vent opening 18 for assuring communication between the interior of the can and the atmosphere.

The arcuate punch 14 includes a raised intermediate portion 19 having grooves or channels 20 therein which slidably receive the side walls of the slot 11. The reference numeral 21 designates a resilient handle which is secured at its forward end only to the raised portion 19 of the arcuate punch 14, as at 22. The resilient handle 21 terminates in an inturned free rear end portion 23 which is engageable with the upper portion of the can 4 through the enlargement 12, as illustrated to advantage in Figure 5 of the drawings.

It is thought that the operation of the invention will be readily apparent from a consideration of the foregoing. To open a can of milk, the dome 1 is mounted on top of said can with the skirt 2 encircling the upper portion thereof. The arcuate punch 14 is then moved forwardly through the medium of the handle 21 and caused to penetrate the top 5 of said can at a point adjacent the spout 10 as best seen in Figure 4 of the drawings. The arcuate punch 14 is then reversed to cause the rear end thereof to penetrate the can top thereby forming the vent opening 17. The vent 18 in the punch 14 assures the passage of air through the opening 17. When in the position shown in Figure 5 of the drawings the resilient handle 21 is under tension and the portion 23 thereof bears against the can with sufficient force to detachably secure the attachment in position on said can. To remove the device when the can is empty or for any other reason it is only necessary to spring the resilient handle 21 outwardly after which the entire device may be readily lifted from the can. The forward end of the slot 11 limits the forward movement of the punch 14. When inserting the punch 14 in the slot 11, the fingers 13 are bent outwardly to permit the passage of said punch, after which said fingers are returned to the position shown in Figure 3 of the drawings to prevent accidental detachment of the punch from the dome 1 when the attachment is not mounted on a can. With the attachment in the position shown in Figure 5 of the drawings the can may be conveniently lifted through the medium of the handle 21 and tilted to pour the milk through the opening 16 and the spout 10.

Figure 6:
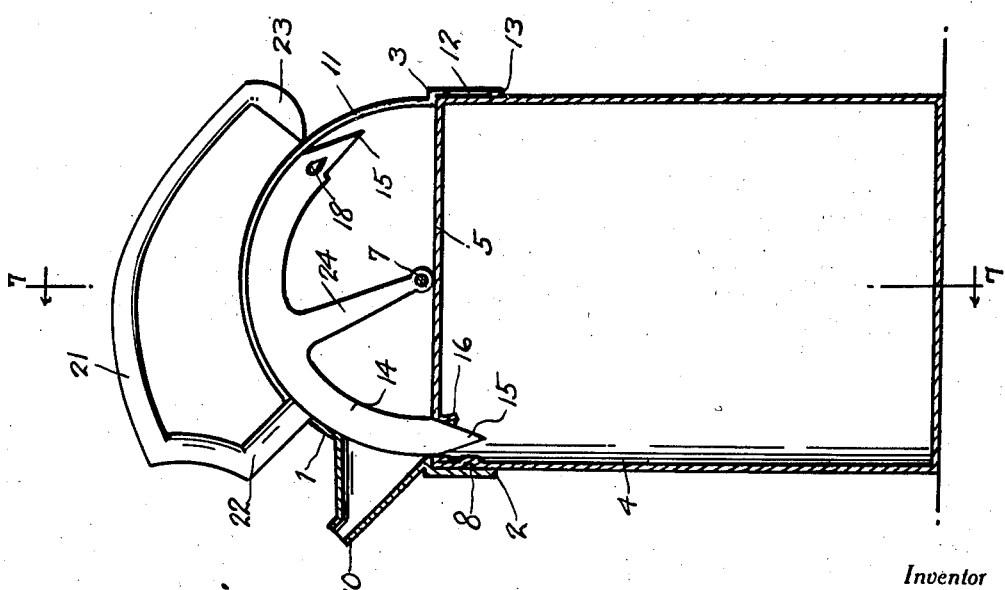
Figure 6 is a view in vertical section through a modified form of the invention, showing the device applied to a milk can in which the pouring opening has just been punched.

In the modified form of the invention shown in Figures 6 and 7 of the drawings, the arcuate double-acting punch 14 is mounted on the free end of an arm 24 which is journaled to swing in a vertical plane on the rod 7 or on any other suitable pivot. In this embodiment of the invention the grooves or channels 20 in the arcuate punch 14, may, if desired, be eliminated. The operation of this modification is substantially similar to the operation of that form of the invention illustrated by Figures 1 to 5 inclusive.

It is believed that the many advantages of a milk can attachment constructed in accordance with the present invention will be readily understood and although preferred embodiments of the device are as illustrated and described, it is to be understood that further modifications and changes in details of construction may be resorted to which will fall within the scope of the invention as claimed.

What is claimed is:—

1. A milk can attachment comprising a dome adapted to be mounted on a can, a pouring spout projecting from said dome, an arcuate punch slidably mounted in the dome and guided thereby and operatively engageable with the can, and means for actuating said punch.

2. A can attachment of the class described comprising a dome adapted to be mounted on a can, a pouring spout projecting from the dome, an arcuate punch slidably mounted in the dome and guided thereby, said punch terminating, at its ends, in points for penetrating the can, and common means for actuating the punch and for detachably securing the dome in position on the can.

3. A can attachment of the class described comprising a dome adapted to be mounted on a can, said dome having a slot therein, a pouring spout projecting from the dome, an arcuate punch slidably mounted in the slot and terminating, at its ends, in points adapted to penetrate the can, and a resilient handle secured, at one end, to the punch for actuating said punch, the free end of said handle being engageable with the can for detachably securing the dome in position thereon.

4. A can attachment comprising a dome adapted to be mounted on a can, said dome having a slot therein, an annular skirt depending from the dome and adapted to encircle the can, a pouring spout projecting from the dome, an arcuate punch slidably mounted in the dome and terminating, at its ends, in points adapted to penetrate the top of the can, and a resilient handle connected at one end only to the punch for actuating said punch, the free end of said handle being engageable through the slot with the can for detachably securing the dome thereon.

5. A can attachment comprising a dome adapted to be mounted on a can, an annular skirt depending from the dome and adapted to encircle the can, a shoulder between said skirt and the dome engageable on top of the can, a pouring spout projecting from the dome, an arcuate punch slidably mounted in the dome and terminating in pointed ends adapted to penetrate the top of the can, and common means for actuating the punch and for detachably securing the dome in position on the can.

6. A can attachment of the class described comprising a dome adapted to be mounted on a can, a skirt depending from the dome and adapted to encircle the can, a pouring spout projecting from the dome, said dome having a slot extending from a point adjacent the pouring spout through the rear portion of the skirt, an arcuate punch slidably mounted in said slot, said punch including pointed ends adapted to penetrate the top of the can, a resilient handle secured at one end only to the punch, said handle constituting means for actuating said punch, and means on the free end of said resilient handle engageable with the can for detachably securing the dome in position on said can.

7. A can attachment comprising a dome adapted to be mounted on a can, an arm mounted for swinging movement in said dome, a punch mounted, at an intermediate point, on said arm, the ends of said punch being engageable with the can for puncturing said can, and means for actuating the punch.

8. A can attachment comprising a dome adapted to be mounted on a can, said dome having a slot therein, a rod traversing the dome, an arm journaled for swinging movement on said rod, an arcuate punch mounted, at an intermediate point, on the free end of the arm, the ends of said punch being engageable with the can for puncturing said can, and a handle connected to the punch and operable in the slot, said handle constituting means for actuating the punch.

9. A can attachment of the class described comprising a dome adapted to be mounted on a can, said dome having a slot therein, an arcuate punch mounted for swinging movement in the dome, said punch terminating, at its ends, in points adapted to penetrate the top of the can, and a handle mounted on the punch and operable in the slot for actuating said punch.

10. A can attachment of the class described comprising a top adapted to be mounted on a can and having a dome-shaped portion and a slot therein and also having a pouring spout, and an arcuate punch having a portion disposed and slidable in said slot, said punch terminating at its end in points for penetrating the can.

JOE T. RIEDL.